United States Patent [19]

D'Angelo

[11] Patent Number: 4,706,507

[45] Date of Patent: Nov. 17, 1987

[54] TORQUE MEASURING DEVICE HAVING DUAL RANGE LOAD CELLS

[75] Inventor: Severino D'Angelo, Laguna Beach, Calif.

[73] Assignee: Horiba Instruments Incorporated, Irvine, Calif.

[21] Appl. No.: 831,987

[22] Filed: Feb. 21, 1986

[51] Int. Cl.$^4$ ............................ G01L 3/00; G01L 1/26
[52] U.S. Cl. ................................ 73/862.08; 73/862.52
[58] Field of Search ........... 73/862.08, 862.09, 862.29, 73/862.31, 862.52, 1 C

[56] References Cited

U.S. PATENT DOCUMENTS

| | | | |
|---|---|---|---|
| 3,115,034 | 12/1963 | De Hart | 73/862.14 |
| 3,175,393 | 3/1965 | Sachers | 73/862.17 |
| 4,077,255 | 3/1978 | Murakami | 73/117 |
| 4,282,762 | 8/1981 | Zenker | 73/862.52 |
| 4,375,243 | 3/1983 | Doll | 73/862.52 X |

FOREIGN PATENT DOCUMENTS 0143421 11/1980 Japan ................................ 73/862.52

Primary Examiner—Charles A. Ruehl
Attorney, Agent, or Firm—Harness, Dickey & Pierce

[57] ABSTRACT

A torque measuring device having dual range load cells is provided featuring high accuracy over a large range of torque measurements. A pair of load cell assemblies act on the torque arm of a dynamometer torque balance. A compliant element is employed to connect the torque arm to a low range load cell assembly and lost motion means are provided by the high level load cell assembly. Low torques imposed on the torque balance cause only the low range load cell to be loaded. The low range load cell assembly is selected to provide high accuracy over the low torque range levels. Once a predetermined threshold torque is applied, the deflection of the compliant element permits the torque arm to engage the high level load cell assembly. Torques beyond the threshold level are determined by summing the measured torques of both load cell assemblies. Several embodiments are described which disclose various means for providing a compliant linkage for the low range load cell assembly and for providing a lost motion coupling for the high range load cell assembly.

17 Claims, 6 Drawing Figures

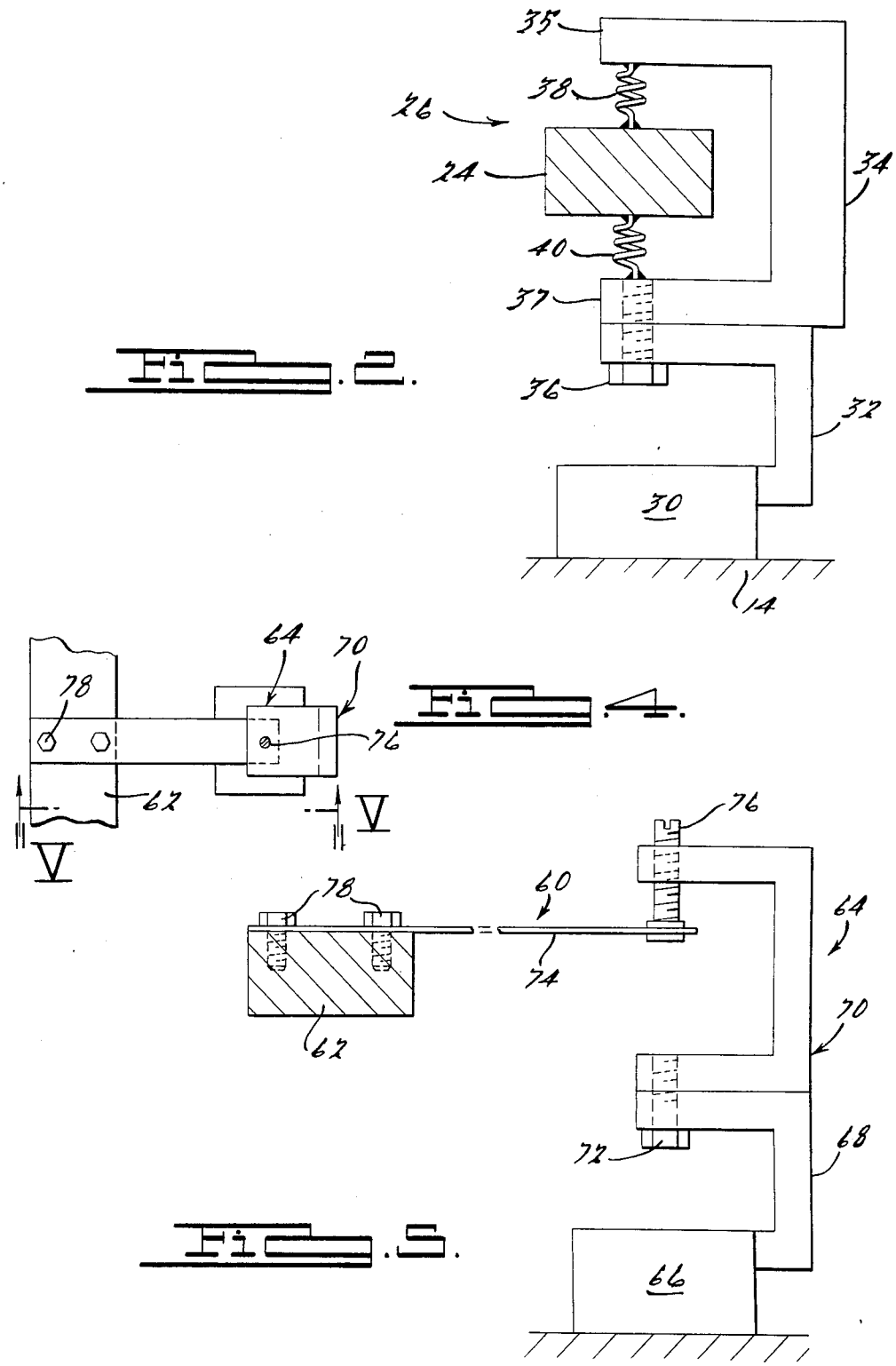

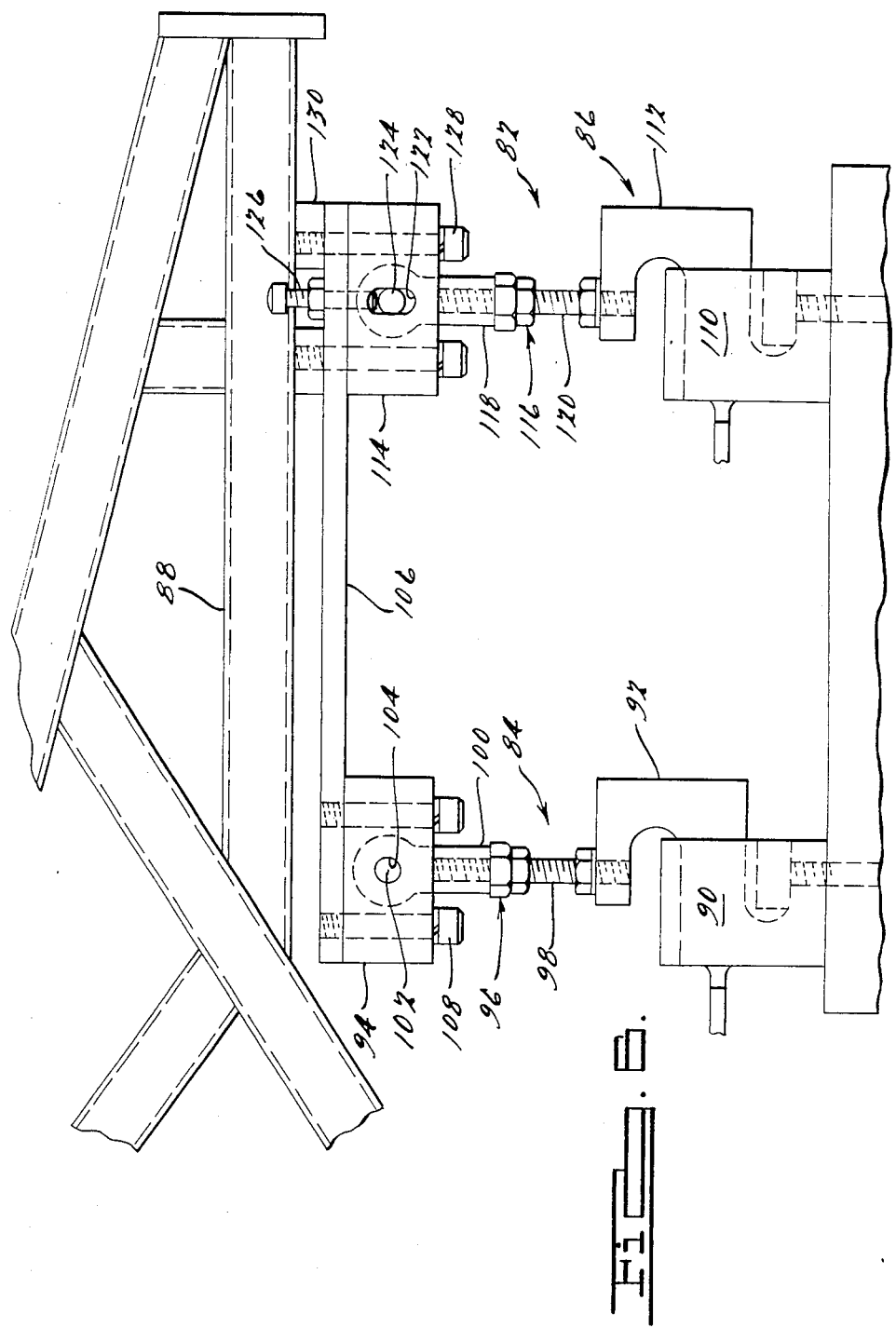

TORQUE MEASURING DEVICE HAVING DUAL RANGE LOAD CELLS

BACKGROUND AND SUMMARY OF THE INVENTION

This invention relates to a torque measuring device, and particularly, to such a device employing dual load cell assemblies which provide high accuracy over a large range of measurement.

Precision torque measuring devices are employed in numerous mechanical devices. One such application where highly accurate torque measurements are needed is in dynamometer devices. Dynamometers are often used for measurement of the output horsepower of a prime mover or measurement of losses which occur in transmitting torque through machine components. Typically, the machine to be tested on a dynamometer is mounted to a torque balance frame which is not restrained torsionally. Rotation of the torque balance frame is resisted by an extending torque arm which is coupled to a load cell device. Forces measured by the load cell are related to the torque loads generated by the test article. While such devices generally operate satisfactorily, there is a continuing need to provide such systems with greater accuracy over a broad range of applied torques. Conventional load cell designs possess a direct trade-off in terms of their useful measuring range versus accuracy. This limitation is inherent since the resistance strain gauges or other strain measuring devices within a load cell are capable of accurate measurements over a relatively narrow range and can be damaged by excess strain.

In view of the foregoing, it is desirable to provide an improved torque measuring device featuring high accuracy over a large range. In accordance with this invention, such improvements are provided through the use of a pair of load cell assemblies, one of which being employed to measure low torque levels, and a second being employed to measure high torque levels. A compliant element is provided which couples a dynamometer torque arm to the low range torque measuring load cell assembly and lost motion means are provided for the high range load cell assembly. With this arrangement, only the low range load cell assembly is loaded at low torque levels. Higher applied torque loads cause forces to be applied to both load cell assemblies such that the total torque is calculated by summing the readings from both load cells.

The above arrangement results in substantially eliminating any lack of homogeneousity between the high torque range and the low torque range because the readings of the two cells are always added. Thus, for readings in the low torque range, the cell for the high torque range reads a zero or constant low reading for which the torque measuring device can compensate. Similarly, for readings in the high torque range, the cell for the low torque range reads a substantially constant, maximum or saturated value. Therefore, because the readings of the two cells are always added to one another, there is no lack of homogeneity between the two torque ranges, and a smooth, substantially continuous total measuring range is obtained.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a cross-sectional view taken along lines 2—2 of FIG. 1 particularly showing the low range load cell assembly;

FIG. 4 is a partial top view of a torque arm and a low range load cell assembly in accordance with a second embodiment of this invention; and FIG. 5 is a cross-sectional view taken along line 5—5 of FIG. 4.

FIG. 6 is a side elevational view of a torque measuring device according to a third embodiment of this invention.

DETAILED DESCRIPTION OF THE INVENTION

Figure 1:
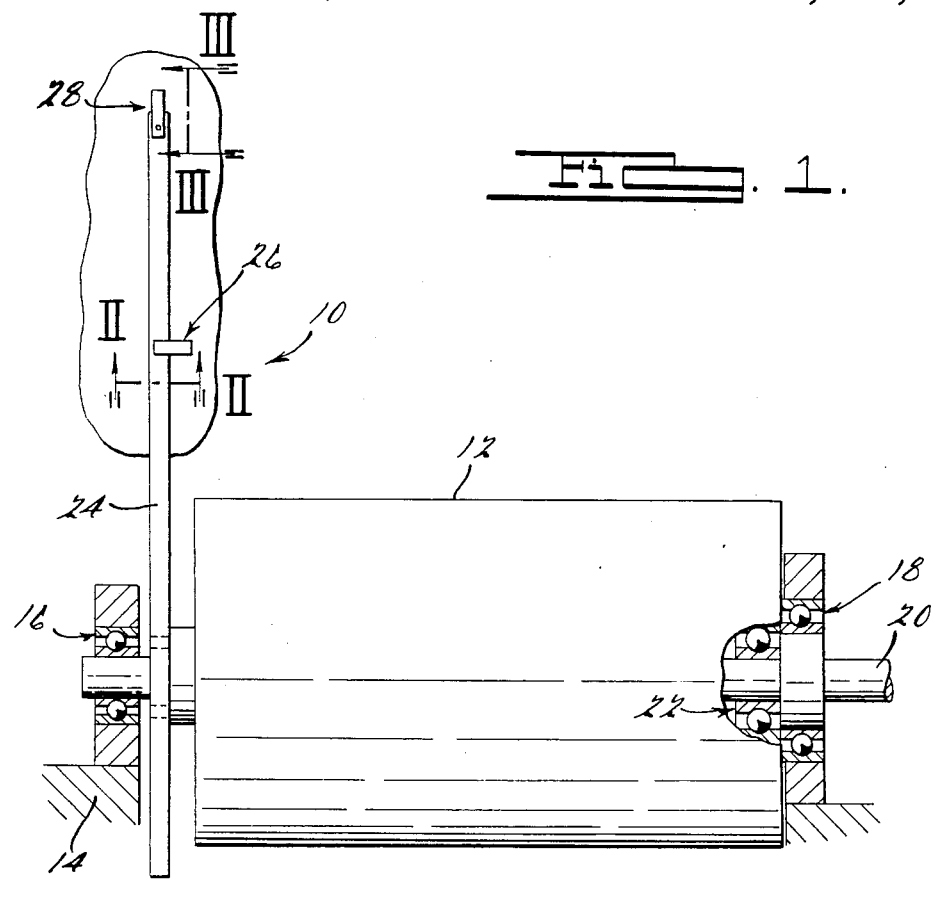
FIG. 1 is a top view of a torque balance assembly of a dynamometer showing a torque arm and dual range load cell assemblies in accordance with a first embodiment of this invention.

FIG. 1 shows a torque measuring device incorporating the novel features of this invention which is generally designated by reference number 10. Torque measuring device 10 includes a test section 12 shown as a generally rectangular housing. Test section 12 is mounted with respect to dynamometer frame 14 by a pair of end bearings 16 and 18 such that the test section is not restrained torsionally with respect to the frame, thus providing a torque balance. Test section 12 is adapted to provide a mounting structure for a device for testing. Such a test unit could be any machine having a rotating shaft input or output such as an electric motor, gear reduction unit, etc. Torque loads are transferred to or from test section 12 by rotating shaft 20. Shaft 20 is supported relative to test section 12 by bearings 22. Torque arm 24 extends radially from the axis of rotation of test section 12 and is affixed to the test section. The above-described elements provide a means for measuring torque loadings exerted by a test device since torque which is applied by shaft 20 are reacted against by forces applied to torque arm 24. In accordance with conventional practices, a load cell device is employed at a designated position along torque arm 24. Torque loadings are then measured as the product of the force imposed on the load cell and its radial distance from the center of rotation of test section 12.

In accordance with a first embodiment of this invention, a pair of load cell assemblies 26 and 28 are provided which are coupled to torque arm 24. Low range load cell assembly 26 is best described with reference to FIG. 2. Low range load cell assembly 26 includes load cell 30 having an arm 32 extending therefrom. A C-shaped bracket 34 is affixed to arm 32 by threaded fastener 36. Bracket 34 has an internal clearance defined by legs 35 and 37 which is larger than the height of torque arm 24. Bracket 34 is coupled to torque arm 24 by a pair of coil springs 38 and 40. Movement of torque arm 24 causes springs 38 and 40 to undergo deformation, thereby exerting forces on bracket 34 which is transmitted to load cell 30.

Figure 3:
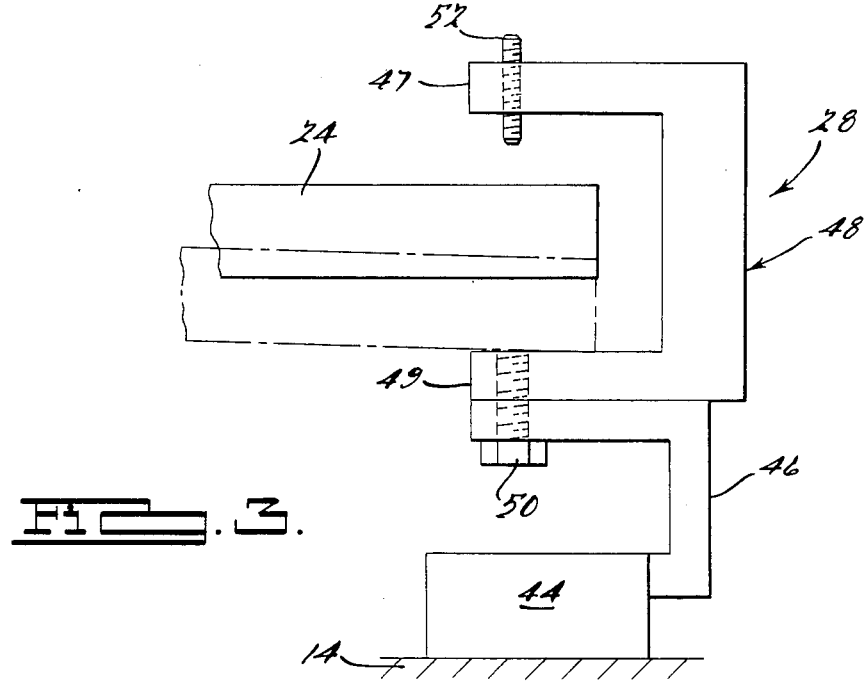
FIG. 3 is a cross-sectional view taken along line 3—3 of FIG. 1 particularly showing the high range load cell assembly.

High range load cell assembly 28 is best described with reference to FIG. 3. High range load cell assembly 28 includes load cell 44 having arm 46. C-shaped bracket 48 is affixed to arm 46 by fastener 50. The open space defined between legs 47 and 49 of bracket 48 is larger than the height of torque arm 24. Unlike low range cell assembly 26, no compliant couplings are provided for high range load cell assembly 28 such that a predetermined degree of "lost motion" is provided. Accordingly, high range load cell 44 becomes loaded only when the deflection of torque arm 24 exceeds a predetermined range and comes into physical contact with bracket 48. Set screw 52 is employed within bracket 48 to adjust the range of lost motion provided by the bracket. As shown in FIG. 1, low range load cell assembly 26 is located at a radial distance from the axis of rotation of test section 12 which is less than the radial distance of high range load cell assembly 28, thus increasing the magnitude of force applied onto load cell 30 by a given torque loading. This increased loading on load cell 30 may be advantageous depending on the particular characteristics of the load cell being employed.

In operation, when low levels of torque are applied by test section 12, slight deflection of torque arm 24 and springs 38 and 40 results. Forces on springs 38 and 40 are transferred to load cell 30 where they are measured. The lost motion provided by bracket 48 is set such that no loads are restrained by load cell 44 until a predetermined cut-off or threshold torque is reached. Load cell 30 is selected to provide high accuracy over the low range of force levels. Once the desired upper operating limit of load cell 30 is approached, the deflection of torque arm 24 reaches a point at which the torque arm comes into mechanical engagement with bracket 48 of high range load cell assembly 28. After that threshold torque level is reached, the total torque applied by test section 12 is determined by summing the torque derived from the readings of both load cell assemblies 26 and 28. In order to avoid overloading of low range load cell 30, springs 38 and 40 are selected and oriented so that they can continue to deflect after high range load cell assembly 28 becomes operative. Therefore, continued deflection of torque arm 24 or other components will not result in possibly damaging loads being applied to low range load cell 30.

FIGS. 4 and 5 illustrate a second embodiment of this invention. FIG. 4 is a partial view of torque measuring device 60 having torque arm 62 which is affixed to a torque balance (not shown) of the type previously described. Torque measuring device 60 is identical to torque measuring device 10 with the exception of the design of low range load cell assembly 64. Load cell assembly 64 includes load cell 66, arm 68, bracket 70 and fastener 72. Leaf spring 74 is provided which is mounted in cantilever fashion and has one end connected to torque arm 62 by fasteners 78, and another engaging load cell assembly 64. Leaf spring 74 performs the function of springs 38 and 40 described above. Set screw 76 is provided to adjust the cutoff point of the system by changing the level of deflection of leaf spring 74 necessary in order to permit torque arm 62 to engage the high range load cell assembly (not shown). Operation of the second embodiment shown in FIG. 4 otherwise proceeds like that of the first embodiment.

FIG. 6 illustrates a torque measuring device 82 according to a third embodiment of this invention. Like the previously described embodiments, torque measuring device 82 includes low range load cell assembly 84 and high range load cell assembly 86 which are used to measure forces on torque arm 88. Torque arm 88 is shown as a truss-like assembly unlike the earlier depiction of a torque arm.

Low range load cell assembly 84 includes load cell 90 having arm 92 which is connected to mounting block 94 by coupling 96. Coupling 96 includes threaded bolt 98 which threads into coupling end 100. Mounting block 94 has pin 102 which passes through bore 104 of coupling end 100. Mounting block 94 is affixed to cantilever leaf spring 106 by fasteners 108.

High range load cell assembly 86 includes load cell 110 with arm 112, mounting block 114 and coupling 116 with bolt 120. Coupling end 118 is identical to coupling end 100 except that it includes a vertically elongated slot 122. Slot 122 permits pin 124 to travel through a range of motion before engaging the extreme ends of the slot. Preferably, means are provided for adjusting the position of pin 124 to thereby adjust the range of lost motion before load cell 110 becomes loaded. One means of accomplishing this feature is providing bolt 126 which controls the position of pin 124. Threaded fasteners 128 are used to clamp cantilever leaf spring 106 between mounting block 114 and spacer 130, and to mount the assembly to torque arm 88. In operation, torque measuring device 82 functions like the previous embodiments. This embodiment, although using a leaf spring like the second embodiment, differs from the second embodiment in that spring 106 extends in the direction of extension of torque arm 88 rather than perpendicular thereto as shown by FIGS. 4 and 5. This arrangement provides a different radial distance for the two load cell assemblies.

While the above description constitutes the preferred embodiments of the present invention, it will be appreciated that the invention is susceptible to modification, variation and change without departing from the proper scope and fair meaning of the accompanying claims.

What is claimed is:

1. A torque measuring device adapted to measure forces exerted on an extending torque arm, comprising:
   a low range load cell,
   a leaf spring coupling said low range load cell to said torque arm,
   a high range load cell, and
   lost motion means for coupling said high range load cell to said torque arm such that loads exerted by said torque arm are transmitted to said high range load cell only after said leaf spring undergoes a predetermined degree of deflection whereby loads are transmitted only to said low range load cell when a load applied by said torque arm is below a threshold level, and loads are transmitted to both said low and said high range load cells when a load applied by said torque arm is equal to or greater than said threshold level; said lost motion means comprising a pin fixed with respect to said leaf spring and a coupler attached to said high range load cell, said coupler having an elongated slot with said pin disposed therein.

2. A torque measuring system adapted to measure loads exerted on a torque arm extending from a torque balance which is rotatable about an axis, comprising:
   a low range load cell,
   compliant means coupling said low range load cell to said torque arm at a first radial distance from said axis,
   a high range load cell, and
   lost motion means coupling said high range load cell to said torque arm at a second radial distance from said axis, said second radial distance being greater than said first radial distance, such that loads exerted by said torque arm are transmitted to said high range load cell only after said compliant means undergoes a predetermined degree of deflection whereby loads are transmitted only to said low range load cell when a load applied by said torque arm is below a threshold level, and loads are transmitted to both said low and said high range load cells when a load applied by said torque arm is equal to or greater than said threshold level.

3. The torque measuring system according to claim 2 wherein said torque arm is coupled to a torque balance of a dynamometer.

4. The torque measuring system according to claim 2 wherein said compliant means comprises at least one coil spring.

5. The torque measuring system according to claim 2 wherein said compliant means comprises a leaf spring.

6. The torque measuring system according to claim 5 wherein said leaf spring extends in a direction parallel to the direction of extension of said torque arm.

7. The torque measuring system according to claim 5 wherein said leaf spring extends in a direction perpendicular to the direction of extension of said torque arm.

8. The torque measuring system according to claim 5 wherein said lost motion means comprises a pin fixed with respect to said leaf spring and a coupler attached to said high range load cell, said coupler having an elongated slot with said pin disposed therein.

9. The torque measuring system according to claim 2 wherein said lost motion means comprises a generally C-shaped bracket coupled to said high range load cell, said torque arm being interposed between extending legs of said bracket such that said torque arm must be deflected to engage either of said bracket legs.

10. A torque measuring system adapted to measure loads exerted on a torque arm extending from a torque balance which is rotatable about an axis, comprising:
   a low range load cell assembly including:
      a low range load cell,
      a first generally C-shaped bracket connected to said low range load cell, said first bracket having a pair of extending legs, said torque arm disposed between said legs,
      at least one spring member coupling said low range load cell to said first bracket at a first radial distance from said axis,
   a high range load cell assembly including:
      a high range load cell,
      a second generally C-shaped bracket coupled to said high range load cell, said bracket having a pair of extending legs, said torque arm disposed between said legs such that said torque arm contacts said second bracket at a second radial distance from said axis, said torque arm contacting said second bracket and loading said high range load cell only after said spring member undergoes a predetermined degree of deflection whereby loads are transmitted to said low range load cell when a load applied by said torque arm is below a threshold level, and loads are transmitted to both said low and high range load cells when a load applied by said torque arm is equal to or greater than said threshold level.

11. The torque measuring system according to claim 10 wherein said second radial distance is greater than said first radial distance.

12. The torque measuring system according to claim 10 wherein said second radial distance is equal to said first radial distance.

13. A torque measuring system adapted to measure loads exerted on a torque arm extending from a torque balance which is rotatable about an axis, comprising:
   a low range load cell assembly including:
      a low range load cell,
      a first mounting block having a first pin,
      a first coupler having a coupler end defining a bore, said coupler connected to said low range load cell and connected to said first mounting block by disposing said pin through said bore,
   a high range load cell assembly including:
      a high range load cell,
      a second mounting block having a second pin,
      a second coupler having a coupler end defining an elongated slot, said coupler connected to said second mounting block by disposing said second pin in said slot,
      a leaf spring having one end attached to said torque arm and to said second mounting block and having a second end attached to said first mounting block such that said torque arm loads only said low range load cell assembly when the deflection of said leaf spring is below a predetermined level, and loads are transmitted to both said low and said high range load cell assemblies when the deflection of said leaf spring is greater than said predetermined level wherein said second pin reaches an extreme end of said slot.

14. The torque measuring system according to claim 13 wherein means are provided for adjusting the position of said second pin relative to said second mounting block.

15. The torque measuring system according to claim 13 wherein said leaf spring extends in a direction parallel to the direction of extension of said torque arm.

16. The torque measuring system according to claim 13 wherein said leaf spring extends in a direction perpendicular to the direction of extension of said torque arm.

17. A torque measuring device adapted to measure forces exerted on an extending torque arm, comprising:
   a low range load cell,
   compliant means for coupling said low range load cell to said torque arm,
   a high range load cell, and
   lost motion means for coupling said high range load cell to said torque arm such that loads exerted by said torque arm are transmitted to said high range load cell only after said compliant means undergoes a predetermined degree of deflection whereby loads are transmitted only to said low range load cell when a load applied by said torque arm is below a threshold level, and loads are transmitted to both said low and said high range load cells when a load applied by said torque arm is equal to or greater than said threshold level; said lost motion means comprising a generally C-shaped bracket coupled to said high range load cell, said torque arm being interposed between extending legs of said bracket such that said torque arm must be deflected to engage either of said bracket legs.

* * * * *